United States Patent [19]

Tsukimoto et al.

[11] Patent Number: 4,752,711
[45] Date of Patent: Jun. 21, 1988

[54] VIBRATION WAVE MOTOR

[75] Inventors: Takayuki Tsukimoto, Fujisawa; Ichiro Okumura, Yokohama; Kazuhiro Izukawa, Yokohama; Takuo Okuno, Yokohama; Hiroyuki Seki, Sagamihara; Hitoshi Mukohjima, Yokohama; Naoya Kaneda, Yokohama; Akira Hiramatsu, Yokohama, all of Japan

[73] Assignee: Canon Kabushiki Kaisha, Tokyo, Japan

[21] Appl. No.: 843,568

[22] Filed: Mar. 25, 1986

[30] Foreign Application Priority Data

Mar. 29, 1985 [JP] Japan .................. 60-066093
Jun. 21, 1985 [JP] Japan .................. 60-135389
Jun. 21, 1985 [JP] Japan .................. 60-135390
Jun. 21, 1985 [JP] Japan .................. 60-135391

[51] Int. Cl.$^4$ ........................... H01L 41/08
[52] U.S. Cl. ........................ 310/323; 310/328
[58] Field of Search ............... 310/321, 323, 328

[56] References Cited

U.S. PATENT DOCUMENTS 4,495,432  1/1985  Katsuma et al. ............ 310/321 X
4,580,073  4/1986  Okumura et al. ............ 310/328 X
4,587,452  5/1986  Okumura et al. ............ 310/328

Primary Examiner—Mark O. Budd
Attorney, Agent, or Firm—Fitzpatrick, Cella, Harper and Scinto

[57] ABSTRACT

A vibration wave motor for driving a moving member contacting a vibration member, to which an electromechanical energy transducer element is bonded, by a travelling vibration wave generated in the vibration member, wherein the moving and vibration members contact each other through a plurality of contact points.

11 Claims, 6 Drawing Sheets

VIBRATION WAVE MOTOR

BACKGROUND OF THE INVENTION

1. Field of the Invention

The present invention relates to a structure of a moving member in a vibration wave motor for friction driving the moving member by a travelling vibration wave.

2. Related Background Art

Vibration wave motors which can be driven by a travelling vibration wave have recently been brought into practical use. A known example of such a vibration wave motor will be described with reference to the schematic view of FIG. 4. Referring to FIG. 4, reference numeral 1 denotes an electro-mechanical energy transducer element such as an electrostrictive element, a piezoelectric element or a magnetostrictive element and being made of, e.g., PZT (lead zirconate titanate). A vibration member 2 is made of an elastic material, to which the electrostrictive element 1 is bonded. The vibration member 2 is held together with the electrostrictive element 1 on the side of a stator (not shown). A moving member 3 constitutes a rotor urged against the vibration member 2 to be in contact therewith in this example. A plurality of electrostrictive elements 1 are bonded to the vibration member 2 such that one group thereof is offset from another group by $\frac{1}{4}$ the wavelength $\lambda$ of the vibration wave. The electrostrictive elements in each group are arranged at a pitch $\frac{1}{2}$ the wavelength $\lambda$ such that the polarities of two adjacent elements are opposite.

In the vibration wave motor of this arrangement, assume that an AC voltage of $Vo \cdot \sin\omega t$ is applied to the electrostrictive elements in one group and an AC voltage of $Vo \cdot \cos\omega t$ is applied to the electrostrictive elements in the other group. Then, the polarities of two adjacent elements become opposite, and AC voltages having phases offset by 90° from each other are applied to the two groups to vibrate the elements. The vibration is transmitted to the vibration member 2 to cause a bending vibration in accordance with the pitch of the arrangement of the electrostrictive elements 1. When the vibration member 2 partially projects by bending to correspond to the position of every other electrostrictive element, the positions of the remaining electrostrictive elements are recessed. Meanwhile, the first group of electrostrictive elements is offset from the other group by $\frac{1}{4}$ the wavelength $\lambda$ as described above, allowing travel of the bending vibration. The vibration is energized sequentially while the AC voltage is applied, thereby causing a travelling bending vibration wave to propagate within the vibration member 2.

The travel of the wave in this state is shown in FIGS. 5A, 5B, 5C and 5D. Assume that the travelling bending vibration wave travels in the direction of arrow X1. A central (reference) plane in the vibration member in a stable state is designated as 0. The central plane 0 is in the state indicated by the alternate long and short dashed line in a vibration state, and stress caused by bending competes in a neutral plane 6 of the vibration element 2. Stress does not act on an intersection line $5_1$ of the neutral plane 6 and a sectional plane $7_1$ perpendicular thereto; instead, only vertical vibration occurs. Simultaneously, the sectional plane $7_1$ undergoes pendulum vibration to the right and left about the intersection line $5_1$, and plane $7_2$ or $7_3$ undergoes pendulum vibration to the right and left about an intersection line $5_2$ or $5_3$ in the same manner.

In the state of FIG. 5A, a point P1 on an intersection line of the sectional plane $7_1$ and the surface of the vibration member 2 near the moving member 3 is the right dead point of the right and left vibration and moves only vertically. A force acting on the point P upon the pendulum vibration will be considered. When the intersection line $5_1$ is at the positive side (above the central plane 0) of the wave, stress acts to the left (in a direction opposite the travelling direction X1). When the intersection line $5_1$ is at the negative side (under the central plane 0) of the wave, stress acts to the right. In other words, when the intersection line $5_2$ and the sectional plane $7_2$ are positioned in the manner as described above, stress acts on a point P2 in a direction indicated by the arrow in FIG. 5A. When the intersection line $5_3$ and the sectional plane $7_3$ are positioned in the manner as described above, stress acts on a point P3 in a direction indicated by the arrow. When the wave travels and the intersection line $5_1$ is at the positive side of the wave as shown in FIG. 5B, the point P1 moves to the left and upward simultaneously. In FIG. 5C, the point P1 moves to the left at the upper dead point. When the wave further travels, the point P1 moves to the left and downward simultaneous (FIG. 5(d)), and subsequently, to the right and upward simultaneously, thus returning to the state of FIG. 5A.

When the series of above movement are synthesized, the point P1 performs a spheroidal motion. The radius of the spheroid is a function of t where t is the distance between the neutral plane 6 of the vibration member 2 and the surface thereof near the moving member 3.

Meanwhile, the moving member 3 is urged to be in tight contact with the vibration member 2 and the spheroidal motion at the point P1 on the vibration member 2 friction drives the moving member 3 in an X2 direction. All points including points P2 and P3 on the surface of the vibration member 2 on the positive side of the wave friction drive the moving member 3 in the same manner as the point P1. A moving member and a stator vibration member of a conventional vibration wave motor driven in this manner have a considerably large contact area. More specifically, ultra-fine surface finishing is performed so that the surfaces of the stator and the moving member contact each other at a uniform pressure. Alternatively, the contact surface of the moving member may be divided in a circumferential direction or the moving member comprises an elastic rod or plate, so as to sufficiently follow the flat surface of the stator as described in Japanese Patent Application Laid-open No. 188381/1984.

However, when the moving and stator vibration members are brought into contact with a large contact area, problems arise as follows: First, since the distance between the two flat surfaces, i.e., between the moving and stator vibration members changes in a vibration manner, a positive pressure occurs in the air therebetween, thereby floating the moving member with respect to the stator. The larger the opposing areas, or the narrower the gap between the two flat surfaces, the larger the floating force, thereby lowering the frictional force that drives the moving member of the vibration wave motor and resulting in a considerably lower output of the motor. The influence of a floating force in an air film caused by vibration of a surface is described in Kyosuke Ono, "Lubrication" Vol. 21, No. 9 (1976) pp. 589 to 597.

The second problem concerns vibration propagation on the contact surfaces of the stator vibration and moving members. The stator vibration and moving members are solids and have similar specific acoustic impedances compared to that of the ambient air. Therefore, vibration of the stator vibration member can easily propagate to the contact surface with the moving member.

Specifically, when the vibration motor is stopped, the contact surfaces are large since the stator is not vibrating. In this state, the stator vibration member is not an independent vibration system but is coupled firmly with the moving member when it starts the vibration wave motor. Thus, even if the stator alone is to be vibrated, it cannot be vibrated at a resonant frequency of the stator alone, resulting in failure to energize the vibration wave motor.

SUMMARY OF THE INVENTION

The present invention has been made in view of the above and has as its object to improve an output of a vibration wave motor and to eliminate a drive stop phenomenon resulting from coupling of a moving member and a vibration member.

The other objects of the present invention will be apparent from the following detailed description of the present invention.

In the present invention, it is preferable that the respective contact points of the moving member and the vibration member are point contacts. In order to efficiently give a drive force to the moving member, however, the contact area is preferably maximized. Therefore, in practice, the contact areas of the contact points are designed by considering the above, and it is generally preferable that each contact is made by a circular contact surface with as small an area as possible.

An experiment was conducted with a vibration member having a frequency of 42 kHz and a travelling wave amplitude of 1 μm and a moving member having 18 contact points with a pressure of 1 kgf. When the diameter of the contact circle was 0.3 mm or less, substantially no squeeze effect was observed and good results were obtained. Projections, e.g., semispherical projections for providing the contact points can be formed on either the vibration member or the moving member. However, in order to obtain a constant bending rigidity of the vibration member, the projections are preferably formed on the moving member.

The contact points are preferably provided with a high density along the drive direction of the moving member. When a plurality of rows of the contact points are formed, transmission efficiency of the drive force is improved.

The element bonded to the vibration member can be any electro-mechanical energy transducer element such as an electrostrictive element, a magnetostrictive element or a piezoelectric element.

DETAILED DESCRIPTION OF THE PREFERRED EMBODIMENTS

Figure 1A:
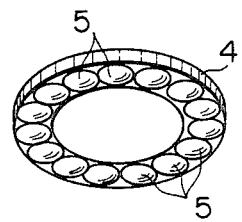
FIG. 1A is a perspective view of a moving member to which an embodiment of the present invention is applied.
Figure 1B:
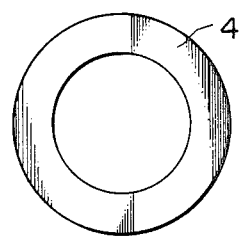
FIGS. 1B, 1C and 1D are plan, front and bottom views, respectively, of the moving member.
Figure 1C:
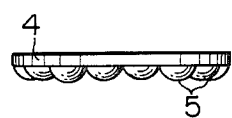
Figure 1D:
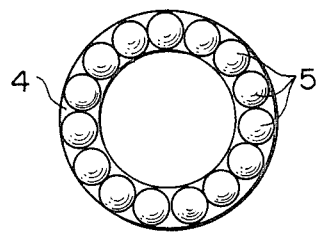

FIG. 1A is a perspective view of an embodiment of the present invention, and FIGS. 1B to 1D are plan, front and bottom view, respectively, thereof.

Figure 4:
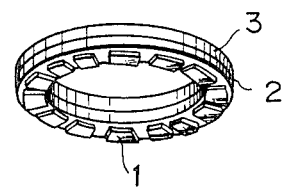
FIG. 4 schematically shows a main part of a conventional vibration wave motor.
Figure 5:
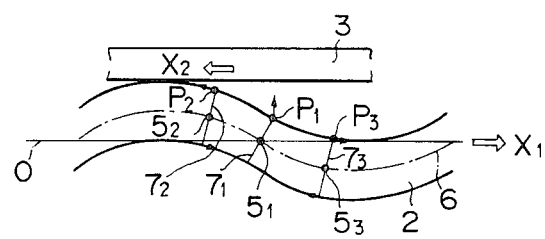
FIGS. 5A, 5B, 5C and 5D are views for explaining a drive principle of a vibration view motor.
Figure 5:
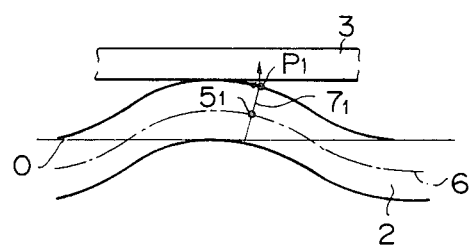
Figure 5:
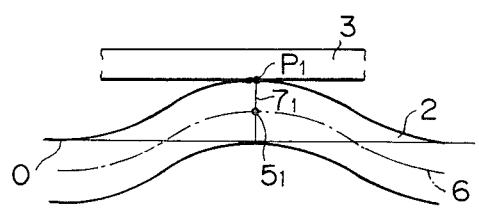
Figure 5:
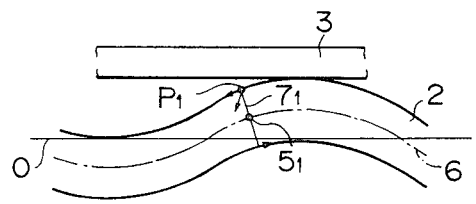

In FIGS. 1A to 1D, semispherical (slightly flat) projections 5 are formed along the circumferential direction of a surface of a rotor moving member 4 which contacts the vibration member 2 described with reference to FIG. 4. The projections 5 need not be semispherical and slightly flat but can be conical, pyramidal and so on.

Figure 2:
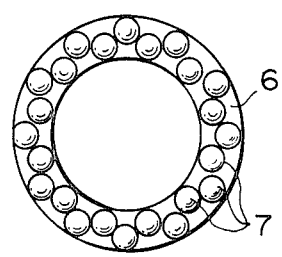
FIG. 2 is a bottom view of a moving member according to another embodiment of the present invention.
Figure 3:
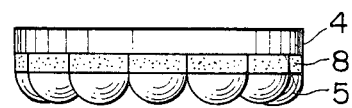
FIG. 3 shows a modification of the present invention.

FIG. 2 shows another embodiment of the present invention. In FIG. 2, projections 7 for providing contact points are arranged in two rows along the circumferential direction of a rotor moving member 6, thereby increasing the torque.

The present invention is not limited to these embodiments but can be applied to an embodiment wherein a moving member is ellipsoidal and a vibration member is in partial contact therewith.

Since a vibration wave motor is driven by the friction of a moving member and a vibration member as described above, detritus is produced between the moving and vibration members. If the detritus is sandwiched between the moving and vibration members, the motor performance is greatly degraded since the amplitude obtained from the vibration member is small, resulting in uneven rotation or low output.

Figure 6:
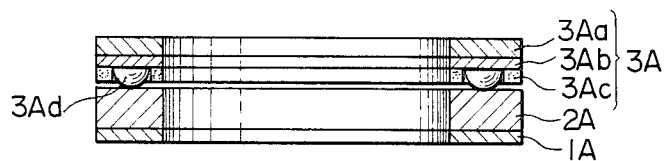
FIG. 6 is a longitudinal sectional view of another embodiment of the present invention.
Figure 7:
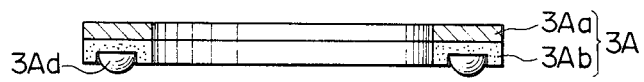
FIG. 7 is a longitudinal sectional view of a moving member according to still another embodiment of the present invention.

This problem is solved in FIGS. 6 to 8.

FIG. 6 shows still another embodiment of the present invention. In FIG. 6, a plurality of electro-mechanical energy transducer elements (e.g., electrostrictive elements) 1A are bonded to a ring vibration member 2A, thereby constituting a stator. A rotor moving member 3A is obtained by bonding a structure 3Aa, an elastic member 34Bb made of rubber or the like, and a permanent magnet 3Ac and bonding a plurality of semispherical contact members 3Ad on the elastic member 3Ab. The structure 3Aa, the elastic member 3Ab and the permanent magnet 3Ac constitute concentric ring plates. In the vibration wave motor having the moving member 3A and the vibration member 2A, only the contact member 3Ad contacts the vibration member 2A, and a gap is formed between the permanent magnet 3Ac and the vibration member 2A. The elastic member 3Ab causes the contact members 3Ad to contact the vibration member 2A uniformly. The vibration member 2A may be made of a magnetic metal material such as steel which has a small internal loss of the vibration energy, or made by coating a magnetic material on a nonmagnetic metal. The structure 3Aa can be made of any material such as a metal or plastic which is rigid and has a stable shape. The contact members 3Ad are made of a wear-resistant material such as hardened steel or ceramic or a wear-resistant material obtained by plating or frame spraying a metal or plastic.

When the contact members 3Ad and the vibration member 2A are made of a magnetic material in the above structure, the detritus has magnetic properties and is thus completely attracted by the permanent magnet 3Ac.

Even when one of the base materials of the contact members 3Ad or the vibration member 2A is a nonmagnetic material, if the surface coating material is a magnetic material such as nickel or chromium, the detritus will be attracted by the permanent magnet 3Ac. As a result, the detritus will not be sandwiched between the moving and vibration members.

FIG. 7 shows a moving member 3A according to still another embodiment of the present invention. An elastic member 3Ab bonded to a structure 3Aa consists of a plastic magnet in order to serve as both the elastic member 3Ab and the permanent magnet 3Ac of FIG. 6. As a result, the same effect as in the embodiment described with reference to FIG. 6 can be obtained. Since the number of components is decreased and a plastic magnet can be easily formed, the manufacture is further facilitated. The stator can be the same as in FIG. 6.

In this embodiment, the rotor and the stator are rings. In vibration wave motors of other types recently proposed, linear reciprocal motion is obtained by the motor, or a moving member and a vibration member are arranged in the radial direction. The present invention can also be applied to these motors.

Still another embodiment of the present invention will be described with reference to FIGS. 8A and 8B. This embodiment is characterized in that contact members for contacting the vibration member are supported by an elastic member so that each contact member can be elastically displaced independently.

Figure 8A:
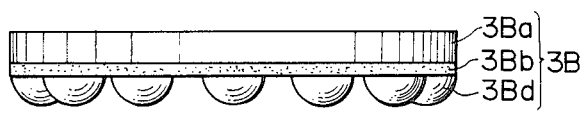
FIG. 8A is a side view of a moving member according to still another embodiment of the present invention.
Figure 8B:
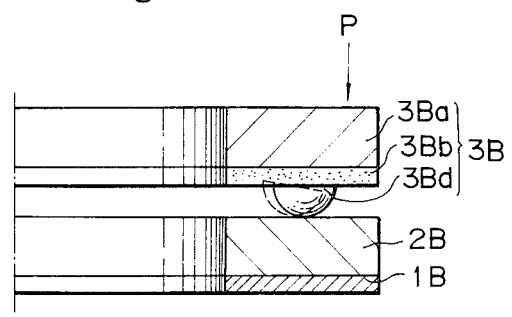
FIG. 8B is a longitudinal sectional view of the moving member of FIG. 8A in contact with a vibration member.

FIG. 8A is a side view of a moving member 3B according to this embodiment of the present invention. The movable member 3B is made by a ring structure 3Ba, a ring elastic member 3Bb made of rubber or sponge and being bonded thereto, and a plurality of semispherical contact members 3Bd bonded thereto. FIG. 8B is a longitudinal sectional view of a vibration wave motor wherein the moving member 3B having this arranegment is combined with a vibration member 2B with an electrostrictive element 1B. The moving member 3B contacts the vibration member 2B at the contact members 3Bd. The vibration member 2B is made of a metallic material such as brass and steel having a small internal loss of the vibration energy. The moving member structure 3Ba can be made of any material such as a metal or plastic which is rigid and has a stable shape. The contact members 3Bd are wear resistant and made of hardened steel, ceramic, or a material obtained by performing an anti-wear surface treatment of a metal or plastic.

With the moving member of the above structure, even if the flatness of the structure 3Ba or the vibration member 2B is not even, the contact members 3Bd are elastically supported to follow the vibration member 2B well, thereby providing uniform contact therebetween. The contact members 3Bd are spherical and point-contact the vibration member 2B, so that high surface precision is not required in manufacturing the contact portions. Even if a pressure acts on a deviated position P as shown in FIG. 8B, causing a moment to act on the contact members 3Bd, the contact portion moves only slightly on the spherical surface of the contact member 3Bd. As a result, the contact state will not be changed and a uniform contact state is maintained. In this manner, the working precision of the surfaces of the vibration member 2B and the contact members 3Bd of the moving member 3B is not strict, and the position of the moving member 3B for applying a pressure on the vibration member 2B can be selected arbitrarily.

Figure 9A:
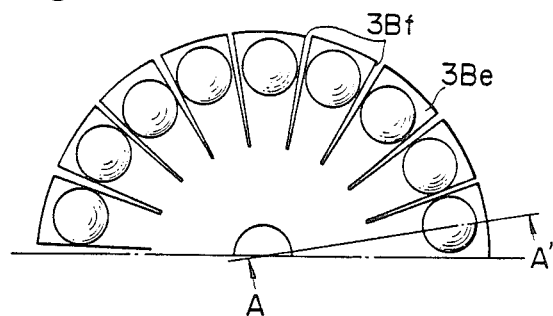
FIGS. 9A and 9B are a rear view of a moving member according to still another embodiment of the present invention and a sectional view taken along the line A—A' thereof.
Figure 9B:
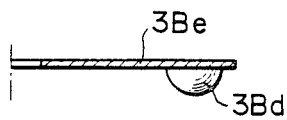

FIG. 9A shows part of a moving member according to still another embodiment of the present invention, and FIG. 9B is a sectional view taken along the line A—A' of FIG. 9A. In this embodiment, slit-like radial notches 3Bf are formed in an elastic disk (e.g., metal plate) 3Be, and semispherical contact members 3Bd are bonded on disk portions defined by the slit portions, respectively, thereby constituting a moving member. The elastic disk 3Be serves as both the elastic member 3Bb and the structure 3Ba of the embodiment of FIG. 8.

Figure 10A:
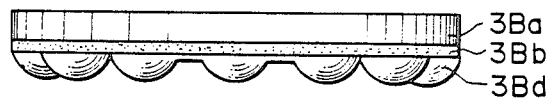
FIGS. 10A and 10B are side and rear views, respectively, of a moving member according to still another embodiment of the present invention.
Figure 10B:
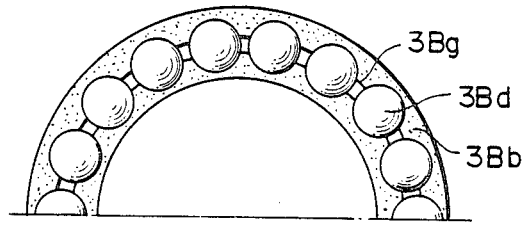

FIG. 10A is a side view of a moving member according to still another embodiment of the present invention, and FIG. 10B is a rear view of the same. In the embodiments of FIGS. 8A and 8B, and 9A and 9B, a plurality of contact members 3Bd are provided, resulting in cumbersome manufacture and a need for a bonding step to the elastic member. In contrast to this, in FIGS. 10A and 10B, contact members 3Bd are connected to each other by portions 3Bg made of the same material as the contact members 3Bd and having sufficient elasticity. With this structure, all the contact members 3Bd can be formed or forged simultaneously, and bonded to an elastic member 3Bb or the elastic disk 3Be easily.

Figure 11:
FIG. 11 shows an example of a contact member used in the present invention.

FIG. 11 shows another example of a contact member 3Bd used in the present invention, which is a cone with a spherical head. In this manner, the contact member can be of any shape depending on the conditions of working or manufacture as long as its contact portion is spherical.

FIGS. 12A to 16 show still another embodiment of the present invention, in which wear of a vibration wave motor having many contact points between moving and vibration members is reduced, a good point-contact state lasts long, and the motor service life is prolonged. This embodiment is characterized in that contact portions between the moving and vibration members of the vibraton wave motor are constituted by a plurality of rotatable balls, and the friction between the balls and the main body of the moving member is made larger than that beteen the balls and the vibration member.

Figure 12A:
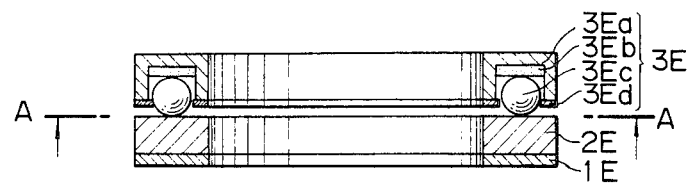
FIGS. 12A and 12B are a longitudinal sectional view and a partial plan view of still another embodment of the present invention and a view taken along the line A—A' thereof.
Figure 12B:
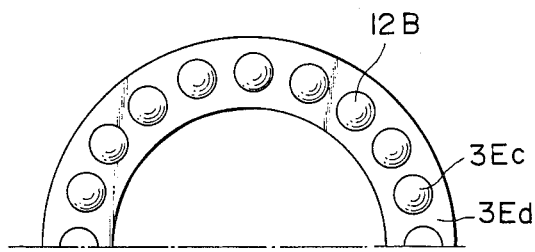
Figure 13:
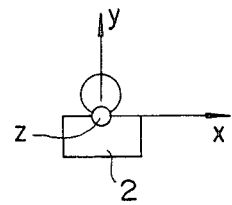
FIG. 13 shows a coordinate system used for explanation of the present invention.

This embodiment will be described with reference to FIGS. 12A to 16. In FIGS. 12A and 12B, a plurality of electro-mechanical energy transducer elements (e.g., PZT) 1E are mounted on a vibration plate 2E. The structure of the electro-mechanical energy transducer elements 1E and the vibration plate 2E is the same as the conventional ones. A moving member 3E consists of a ring moving member structure 3Ea serving as a main body and having a U-shaped section, an elastic member 3Eb such as rubber or sponge provided on the lower surface of the U-shaped portion, wear-resistant balls 3Ec made of a resin or metal and housed in the U-shaped portion, and retainers 3Ed for maintaining the balls 3Ec in position. The structure 3Ea and the elastic member 3Eb, and the structure 3Ea and the retainers 3Ed are bonded to each other. Other components are not bonded. The vibration member 2E is made of a metallic material such as brass or steel having a small internal loss of the vibration energy. The moving member structure 3Ea can be made of any material such as a metal or plastic which is rigid and has a stable shape. Each ball 3Ec is positioned to partially project from a hole in the corresponding retainer 3Ed. Only the balls 3Ec contact the vibration plate 2E. Friction between the elastic plate 3Eb and the balls 3Ec is set to be larger than that between the vibration plate 2E and the balls 3Ec. As a result, the rotation of the balls 3Ec is substantially prevented. However, vibration from the vibration plate 2E is transmitted directly to the balls 3Ec. As a result, a z-direction force caused by a martial particle motion on the surface of the vibration plate 2E together with y-direction vibration acts on the balls 3Ec, and also an x-direction force (FIG. 13) caused by torsion about the z-axis caused by the y-direction vibration of the vibration plate 2E on the balls 3Ec, thereby gradually rotating the balls 3Ec in the z- and x-directions. Then, the contact position on the ball 3Ec with the vibration plate 2E moves as the motor is driven, thereby decreasing wear of the balls, resulting in considerably longer motor service life.

As described above, the balls rotate slightly in both circumferential and radial directions of the moving member. Particularly, acceleration of the moving member is at its maximum when the motor is started and stopped, thereby further rotating the balls. Rotation of the balls in the circumferential direction of the moving member can degrade start and stop characteristics of a motor. In the next embodiment, this problem is solved.

Figure 14A:
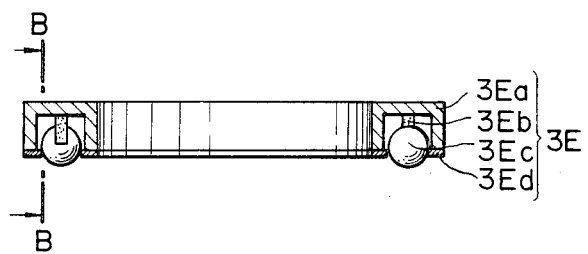
FIGS. 14A and 14B are a longitudinal sectional view of a moving member according still another embodiment of the present invention and a sectional view taken along the line B—B' thereof.
Figure 14B:
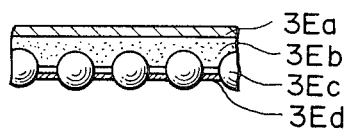
Figure 15:
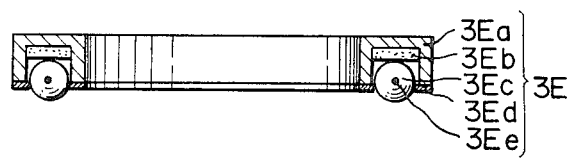
FIGS. 15 and 16 ae longitudinal sectional views, respectively, of moving members according to still other embodiments of the present invention.

FIGS. 14A and 14B show an embodiment wherein an elastic member 3Ed extends in a circumferential direction of a moving member such that its width along the radial direction of a moving member is smaller than a diameter of a ball 3Ec. Notches formed in the elastic member 3Ed contact the ball 3Ec along the circumferential direction of the moving member. With this arrangement, friction of the ball along the circumferential direction of the moving member can be made greater than that along the radial direction of the moving member. Then, the balls cannot rotate easily along the circumferential direction of the moving member. As a result, the above problem is solved. FIG. 15 shows still another embodiment of the present invention. In FIG. 15, a pin 3Ee extends through the ball 3Ec of the embodiment of FIG. 12 along the circumferential direction of the moving member, so that rotation of the ball 3Ec along the circumferential direction of the moving member is prevented, thereby solving the above problem further effectively.

Figure 16:
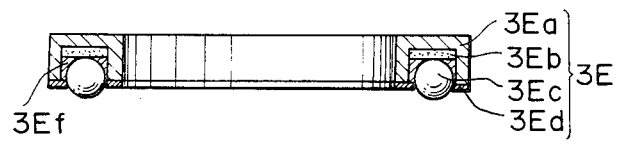

In FIG. 16, an elastic porous material 3Ef such as sponge is provided in the U-shaped portion of the moving member structure of FIG. 12. With this structure, detritus attached to the ball can be removed and collected.

As described above, according to the present invention, the moving member contacts the vibration member with a plurality of semispherical or conical contact points. Therefore, a decrease in friction because of a squeeze effect and coupling of the two members is unlikely to occur, thereby providing a considerably effective vibration wave motor.

According to an embodiment of the present invention, all the magnetic detritus is attracted by the magnet. Therefore, the detritus will not be sandwiched between the moving and vibration members, thereby preventing degradation in the performance of the motor. Also, the motor need not be sealed for preventing scattering of the detritus outside the motor.

According to another embodiment of the present invention, the moving member contacts the vibration member with a plurality of spherical contact members which are supported by an elastic member to be movable. As a result, a uniform contact state can be obtained. Furthermore, since the contact members have spherical contact surfaces, surface finishing with high precision is not required. Even if a moment acts on the contact members due to non-uniform pressure, the contact portions move only slightly, and the uniform contact state can be maintained. Since the moving and vibration members contact in the above manner, no problem occurs due to an air film therebetween, and the detritus will not clog therebetween.

According to still another embodiment of the present invention, the contact points of the balls with the vibration member move gradually while the motor is driven. Therefore, wear is reduced and the point contact state is maintained for a long period of time, thereby prolonging the service life of the motor considerably. The rotation amount of the ball can be minimized, so that a decrease in the rotational speed of the motor is very slight, resulting in substantially no decrease in motor efficiency. Since the vibration member contacts the moving member through a plurality of balls, output of the motor may not be degraded due to an air film therebetween, and detritus can be removed effectively.

What is claimed is:

1. A vibration wave motor comprising:
   vibration means, to which an electro-mechanical energy transducer element is bonded, and which generates a travelling vibration wave;
   moving means friction driven by the vibration wave from said vibration means;
   contact means for point-contacting said moving means and said vibration means; and
   a permanent magnet provided in the vicinity of said contact means.

2. A vibration wave motor comprising:
   vibration means having electro-mechanical conversion elements, for generating a travelling vibration wave when electrical signals having a phase difference therebetween are applied to said elements, said vibration means having a contact-surface composed of a material including at least a magnetic material;

movable means press-contacted to and friction driven by the contact surface of said vibration means, said movable means having a contact member point-contacting said contact surface; and permanent magnet means provided in the vicinity of said contact member.

3. A vibration wave motor according to claim 2, wherein the contact member of said movable means has a hemispherical shape.

4. A vibration wave motor according to claim 3, wherein said contact member is fixed on a main portion of said movable means.

5. A vibration wave motor according to claim 3, wherein said contact member is rotatably coupled with a main portion of said movable means.

6. A vibration wave motor according to claim 2, wherein the contact member of said movable means has a plurality of contact elements arranged in the forward direction of travel of the travelling vibration wave.

7. A vibration wave motor according to claim 2, wherein the contact member of said movable means is composed of a plastic magnet.

8. A vibration wave motor comprising:

circular vibration means having electro-mechanical conversion elements, for generating a travelling vibration wave when electrical signals having a phase difference therebetween are applied to said elements, said vibration means having a contact-surface composed of a material including at least a magnetic material;

circular movable means press-contacted to and friction driven by the contact surface of said vibration means, said movable means having a contact member point-contacting said contact surface; and permanent magnet means provided in the vicinity of said contact member.

9. A vibration wave motor comprising:

vibration means having an electro-mechanical conversion member, for generating a travelling vibration wave when electrical signals having a phase difference therebetween are applied to said member, said vibration means having a contact-surface composed of a material including at least a magnetic material;

movable means press-contacted to and friction driven by the contact surface of said vibration means, said movable means having a contact member point-contacting said contact surface; and permanent magnet means provided in the vicinity of said contact member.

10. A vibration wave motor comprising:

vibration means having electro-mechanical conversion elements, for generating a travelling vibration wave when electrical signals having a phase difference therebetween are applied to said elements, said vibration means having a contact surface;

movable means press-contact to and friction driven by the contact surface of said vibration means, said movable means having a contact member point-contacting said contact surface;

an elastic member disposed between said movable means and said contact member at an upper portion of said contact member;

a container member for forming, in cooperation with said elastic member, a U-shaped containment channel about said contact member; and a retainer, disposed about the open end of the U-shaped containment channel and in contact with a lower portion of said contact member, for retaining the contact member in the U-shaped containment channel, the contact member projecting past said retainer to friction-couple with the contact surface of said vibration means.

11. A vibration wave motor comprising:

vibration means having electro-mechanical conversion elements, for generating a travelling vibration wave when electrical signals having a phase difference therebetween are applied to said elements, said vibration means having a contact surface;

movable means press-contact to and friction driven by the contact surface of said vibration means, said movable means having a contact member point-contacting said contact surface, wherein said contact member of said movable means has a hemispherical shape;

an elastic member disposed between said movable means and said contact member at an upper portion of the contact member;

a container member for forming, in cooperation with said elastic member, a U-shaped containment channel about said contact member; and a retainer, disposed about the open end of the U-shaped containment channel and in contact with a lower portion of said contact member, for retaining the contact member in the U-shaped containment channel, the contact member projecting past said retainer to friction-couple with the contact surface of said vibration means.

* * * * *

UNITED STATES PATENT AND TRADEMARK OFFICE
CERTIFICATE OF CORRECTION

PATENT NO. : 4,752,711

DATED : June 21, 1988

INVENTOR(S) : T. TSUKIMOTO, ET AL.

It is certified that error appears in the above-identified patent and that said Letters Patent is hereby corrected as shown below:

COLUMN 2

Line 26, "simultaneous" should read --simultaneously--.
    Line 29, "movement" should read --movements--.

COLUMN 4

Line 23, "embodmient" should read --embodiment--.
    Line 29, "according still" should read
        --according to still--.
    Line 31, "line B-B'" should read --line B-B--.
    Line 32, "ae" should read --are--.
    Line 40, "view," should read --views,--.

COLUMN 5

Line 4, "member 34Bb" should read --member 3Ab--.
    Line 24, "frame spraying" should read
        --flame spraying--.
    Line 67, arranegment" should read --arrangement--.

UNITED STATES PATENT AND TRADEMARK OFFICE
CERTIFICATE OF CORRECTION

PATENT NO. : 4,752,711

DATED : June 21, 1988

INVENTOR(S) : T. TSUKIMOTO, ET AL.

It is certified that error appears in the above-identified patent and that said Letters Patent is hereby corrected as shown below:

COLUMN 7

Line 63, "solved. FIG. 15" should read
--solved.
    FIG. 15--.

COLUMN 10

Line 9, "press-contact" should read
--press-contacted--.
Line 32, "press-contact" should read
--press-contacted--.

Signed and Sealed this

Sixth Day of December, 1988

Attest:

DONALD J. QUIGG

Attesting Officer     Commissioner of Patents and Trademarks